United States Patent [19]
Noonan et al.

[11] Patent Number: 6,016,877
[45] Date of Patent: Jan. 25, 2000

[54] IMPLEMENT FRAME CONSTRUCTION INCLUDING TUBE WITHIN A TUBE

[75] Inventors: James Thomas Noonan, Johnston; David Alan Payne, Urbandale; Brian Thomas Mosdal; Paul David Parker, both of Ankeny, all of Iowa

[73] Assignee: Deere & Company, Moline, Ill.

[21] Appl. No.: 09/097,291

[22] Filed: Jun. 12, 1998

[51] Int. Cl.[7] .................................................. A01B 15/14
[52] U.S. Cl. ........................ 172/776; 228/173.4; 403/347
[58] Field of Search ................. 172/776, 684.5, 172/310, 314, 395, 673; 403/346, 347, 400; 228/170, 173.4, 174, 160, 165

[56] References Cited

U.S. PATENT DOCUMENTS

| | | | |
|---|---|---|---|
| 3,751,792 | 8/1973 | Frakes | 29/471.1 |
| 3,927,950 | 12/1975 | Herrmann et al. | 403/346 |
| 4,151,694 | 5/1979 | Sriberg et al. | 403/347 X |
| 4,202,484 | 5/1980 | Peterson | 228/173 A |
| 4,579,179 | 4/1986 | Vachon | 172/624.5 X |
| 4,776,719 | 10/1988 | Kreider | 403/347 X |
| 5,001,795 | 3/1991 | Kasten | 403/347 X |
| 5,056,704 | 10/1991 | Martin et al. | 228/173.4 |
| 5,190,207 | 3/1993 | Peck et al. | 228/170 |
| 5,347,939 | 9/1994 | Hood, Jr. et al. | 172/776 X |

FOREIGN PATENT DOCUMENTS

| | | | |
|---|---|---|---|
| 25519 | 11/1922 | France | 403/347 |
| 412476 | 11/1966 | Switzerland | 403/347 |
| 778725 | 7/1957 | United Kingdom | 403/347 |

*Primary Examiner*—Victor Batson

[57] ABSTRACT

An implement frame construction includes a fore-and-aft extending apertured tube with transversely extending tool mounting tubes with cross section matching the shape of the apertures. The tubes are inserted through the apertures to provide a mechanical connection not solely reliant on joint weld strength. The resulting joints are fillet welded on both sides of the fore-and-aft tube and provide more bending and torsional resistance than a butt-welded joint without need for gussets. The smaller tube runs continuously through the joint to reduce the number of components and welds necessary for a given frame configuration. The components themselves position the frame tubes relative to each other to simplify weld fixturing and increase resistance to parallelograming. Hinge areas are provided with welded tube-within-tube construction to prevent wall collapse and retain mounting bolt torque. A main frame section is constructed with continuous fore-and-aft extending hitch tubes which transfer loading directly from the transverse tubes to the towing vehicle and include aft ends for supporting trailing hitch structure. Wing frame sections are built with a similar tube construction, and one frame configuration may be used for right or left wings.

21 Claims, 4 Drawing Sheets

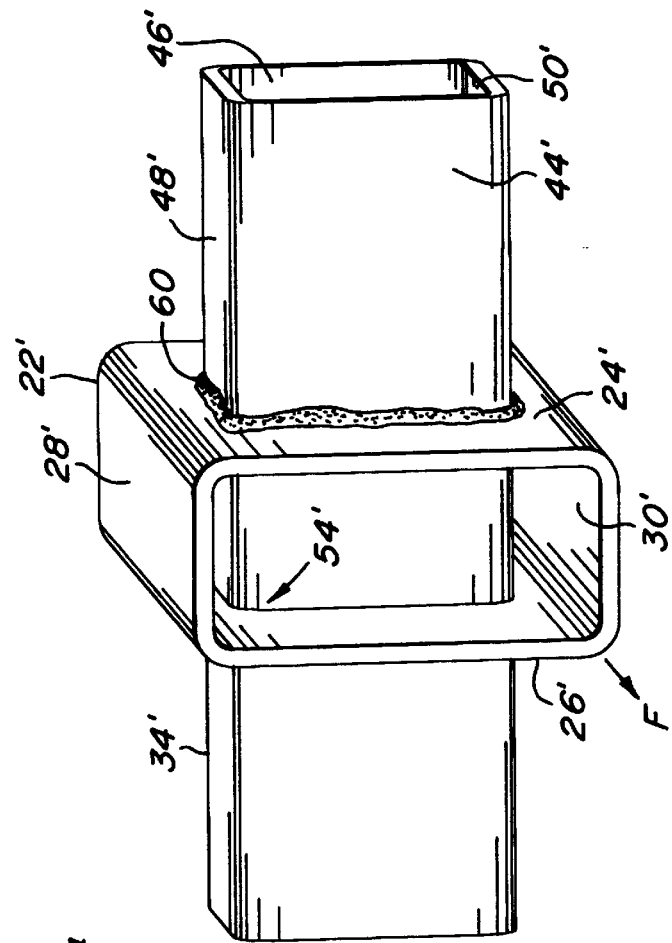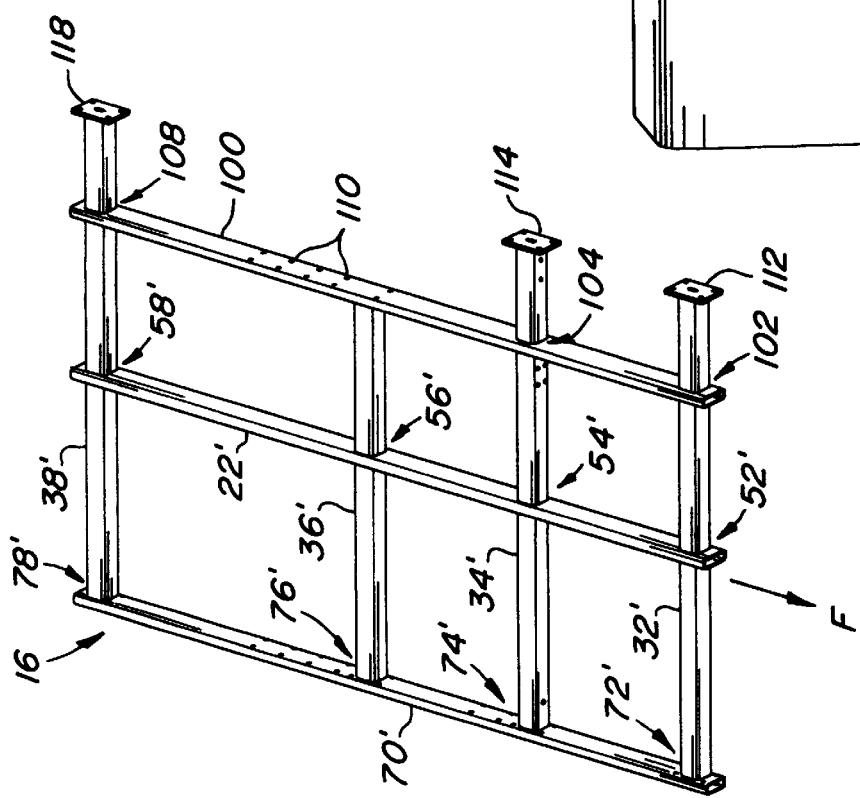

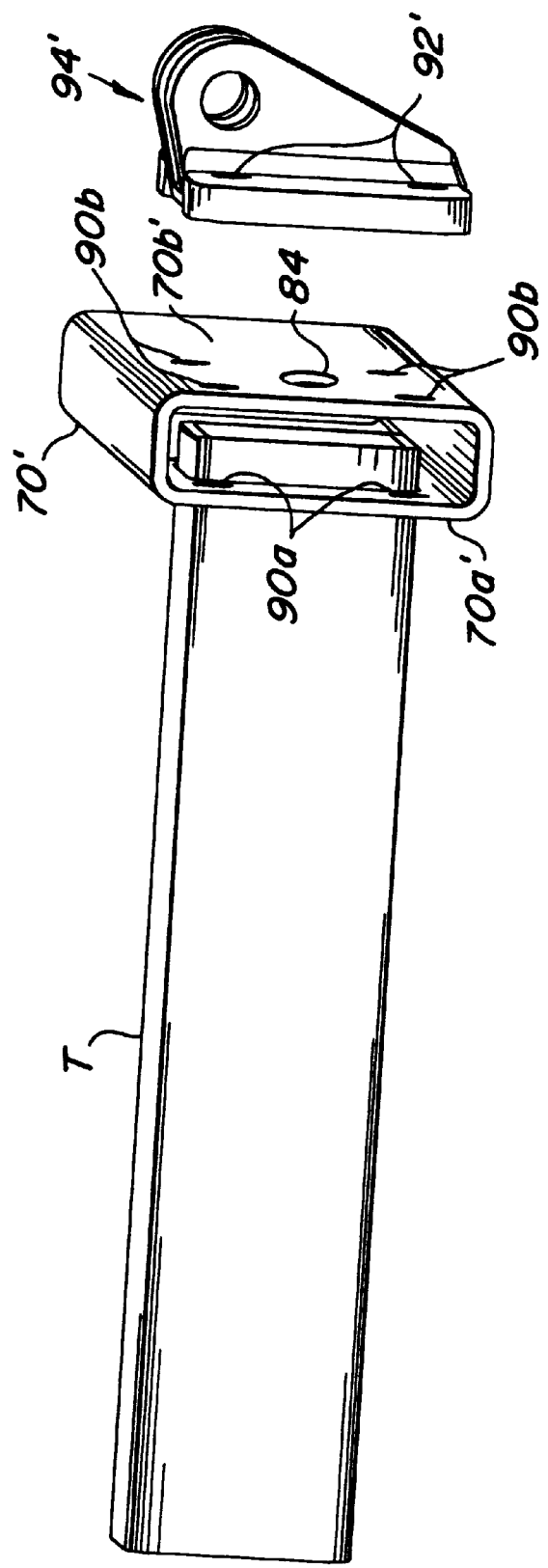

IMPLEMENT FRAME CONSTRUCTION INCLUDING TUBE WITHIN A TUBE

BACKGROUND OF THE INVENTION

1) Field of the Invention

The present invention relates generally to agricultural implements and, more specifically, to a tube frame construction for an implement such as a chisel plow or field cultivator.

2) Related Art

Frames for implements such as field cultivators or chisel plows are typically fabricated by welding a series of similar size tubes together. In some frame fabrication methods, such as shown in U.S. Pat. No. 5,190,207, the end of one tube is laser cut to conform to the shape of the adjoining tube. The cut provides a solid connection by wrapping a portion of the cut tube end around the radius of the adjoining tube, and a shortened weld time is achieved. However, the joint can be expensive compared to a straight joint. Straight cut joints sometimes require filler rods during the weld process and often fail to provide the joint strength and integrity necessary for the heavy loading present during field operations of the implement. The frame sections often are made up of numerous short tube lengths with joint strength relying on the weld. If a weld joint is made improperly, the frame can fail. Further, painting operations often require drain holes in the welded tube members and add extra steps to the frame fabrication process. Numerous gussets are usually required, which add extra welding steps and present paint collection and drip problems during painting operations.

In some agricultural frame constructions, the end of one tube is welded to the side of another tube having a greater dimension (i.e., a tube that is 4×4 inches is welded to the 5 inch face of a 2×5 inch tube). While this joint usually can be formed with a simple fillet weld, the larger wall is prone to flex ("oil canning") due to the loading of the tube welded thereto. The mating tube is attached to the larger wall by a weld joint only, and the wall can deflect under the heavy bending and torsional loads encountered in the field. This deflection greatly reduces fatigue life of the joint. When hinge brackets or the like are attached, the bolts holding the brackets can collapse the wall of the attaching tube. Holding the bolt torque required to maintain joint strength becomes difficult as a result of the wall collapse.

Frame construction often includes clamping or bolting hitch sub-frames to a main frame. The sub-frames transfer draft loads from the towing vehicle to the cross members of the main frame but are expensive to manufacture, ship and assemble. The hitch sub-frame construction often requires expensive connecting points on the main frame. As with any bolted or clamped joint arrangement, the structural integrity and draft load transfer to the cross members is sometimes compromised. A further problem with such an arrangement is that the sub-frame does not extend to the rear of the machine; therefore, adding a rear hitch becomes more difficult.

To provide continuous lateral rank or tube members, some manufacturers use a bridge structure to help transmit loads through the machine. Transversely extending tool-supporting tubes are welded between upper and lower smaller cross section tubes. The bridge structure usually has high weld costs, and many small welds rather than large continuous welds are used. Flare bevel groove welds are necessary and tend to have less structural integrity compared to a fillet weld. The joints tend to crack during combined bending and torsional loading.

BRIEF SUMMARY OF THE INVENTION

It is therefore an object of the present invention to provide an improved frame construction for an agricultural implement. It is another object to provide such a frame construction which overcomes most or all of the aforementioned problems.

It is a further object to provide an improved frame construction for an agricultural implement which eliminates large numbers of short, welded tube sections and reduces or eliminates the need for gussets at tube intersections. It is yet another object to provide such a frame construction which reduces or eliminates tube wall problems at the tube joints caused by bending and torsional loading. It is another object to provide such a frame construction which has fewer parts and fewer problems with frame deformation and joint cracking than at least, most previously available frame constructions.

It is still another object to provide an agricultural frame construction having continuous transversely extending frame tubes without need for bridge structures or clamped or bolted sub-frame assemblies. It is a further object to provide such a construction having better joint and overall structural integrity and better resistance to parallelograming than most previously available frame constructions. It is another object to provide such a construction which provides improved hitch load distribution to lateral tubes.

It is another object to provide a frame construction for agricultural implements which simplifies weld fixturing and welding operations. It is another object to provide such a frame construction that is easier, faster and less costly to manufacture than most previously available frame constructions. It is another object to provide such a construction which advantageously uses holes and through-tubes to provide accurate and positive positioning of frame tubes.

It is another object to provide an implement frame construction having fewer weld start ups and more continuous welds at joints than at least, many previously available frame constructions. It is still a further object to provide such a construction which eliminates coping of joints, filler rods, and flare bevel groove joints. It is another object to provide such a construction which reduces flexing of sidewalls.

It is yet another object to provide an agricultural implement frame construction having an improved hinge area. It is a further object to provide such a construction which has better joint torque retention for a bolted hinge structure than at least most previously available constructions.

An implement frame construction includes a fore-and-aft extending tube having a cross section of first height with apertured sidewalls. Transversely extending tool-supporting tubes with cross section having a height less than the first height and matching the shape of the apertures are inserted through the apertures to provide a mechanical connection not solely reliant on joint weld strength. Bending rigidity is also increased over conventional frame construction since the aperture would have to distort for total joint failure. The apertures allow the transverse tubes to pass through the tube of larger height to eliminate or reduce sidewall flexing or "oil canning" of the larger tube. The resulting joint has more bending and torsional resistance than a butt-welded joint. The frame construction provides easily welded fillet welds on both sides of the larger dimension tube and reduces the number of gussets and the problems associated with gussets. The smaller tube runs continuously through the joint to reduce the number of components and welds necessary for a given frame configuration. Neither tube needs to be coped, and filler rods are eliminated since the fillet weld fills the gap between the larger dimension tube and the through-tube. The components themselves position the frame tubes relative to each other to simplify weld fixturing and increase resistance to parallelogramming.

Hinge areas are provided with increased torsional resistance by passing the smaller height tube through the larger dimension tube and welding the joint and locating the hinge at the joint. In one embodiment, the one sidewall of the larger dimension tube is apertured to receive the transverse tube, and the joint is welded. Hinge bolts pass through the sidewalls, and the welded joint prevents wall collapse to retain bolt torque. In another embodiment, both sidewalls of the larger dimension tube are apertured, the smaller tube passes through and is welded to both sides of the larger dimension tube for improved torsional rigidity and better joint torque retention. The smaller tube protrudes slightly from the outer sidewall, and the hinge is recessed to accept the protrusion and the weld.

Long, continuous fore-and-aft extending hitch tube members obviate hitch sub-frames and evenly distribute hitch loading to the lateral tubes independently of clamped or bolted joints and extensive gusseting. The continuous fore-and-aft members are incorporated into two main frame halves or sections so that sub-frame shipping and assembly are eliminated. Since the hitch tube members are continuous from the hitch to the rear of the machine, a rear hitch option can be added to allow the rear implement draft load to be efficiently transferred to the front hitch of the implement.

These and other objects, features and advantages of the present invention will become apparent from the detailed description below in view of the drawings.

BRIEF DESCRIPTION OF THE DRAWINGS

FIG. 2 is perspective view of a wing frame section for an implement.

FIG. 3 is an enlarged view of a joint on the wing frame section of FIG. 2 and illustrating the joint construction utilized for the frame sections of FIGS. 1 and 2.

FIG. 4 is an enlarged view of an end portion of an implement frame section showing a joint area for a hinge location.

DETAILED DESCRIPTION OF THE DRAWINGS

Figure 1:
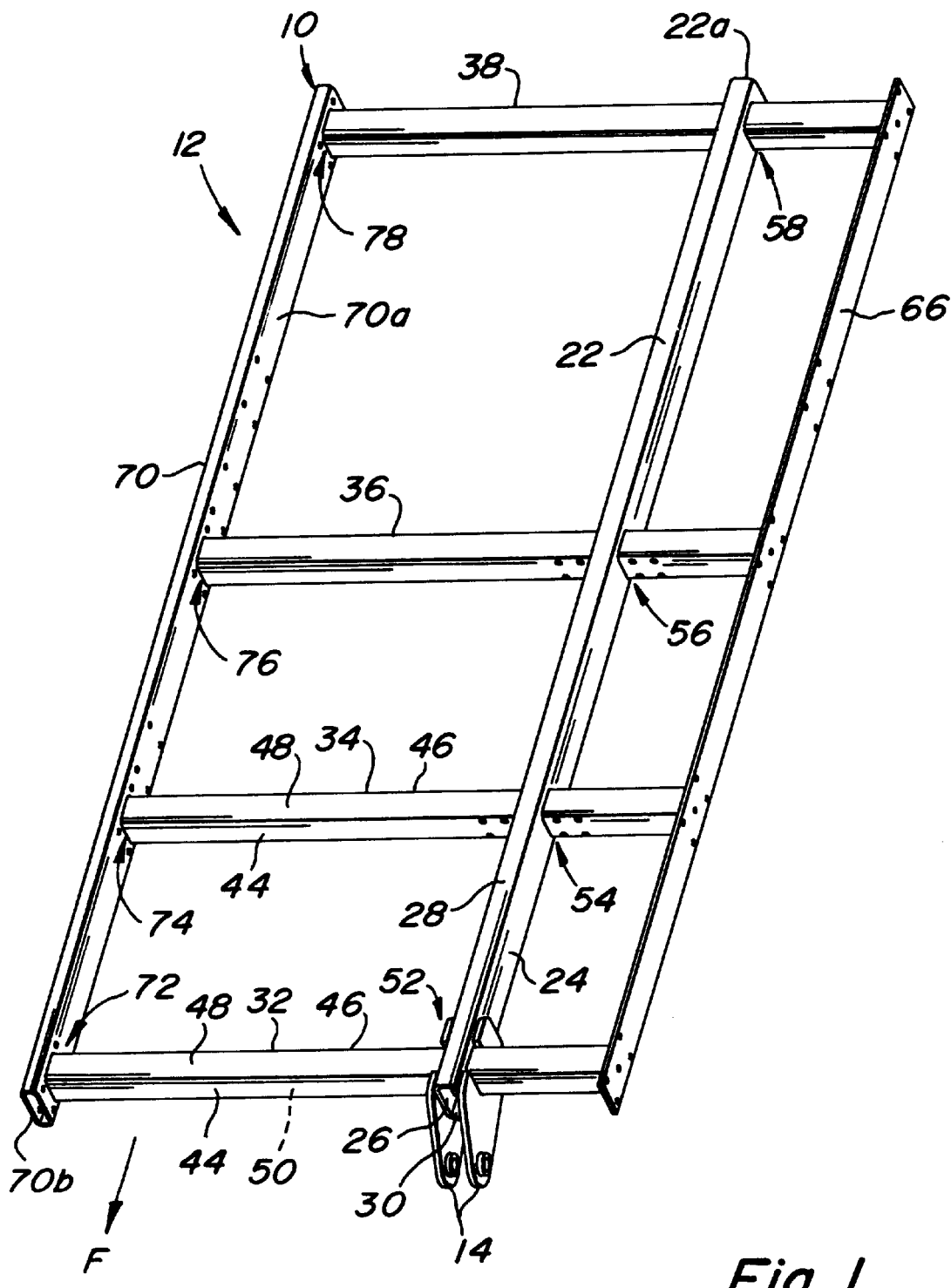
FIG. 1 is a front perspective view of a portion of a main frame (half) section for an implement utilizing the frame construction of the present invention.

Referring now to FIG. 1, therein is shown a portion 10 of a main frame 12 for an implement such as a chisel plow or field cultivator adapted for towing in a forward direction F over the ground by a towing vehicle and hitch (not shown) connected to a forward hitch connector 14. Only the right-hand portion 10 (as viewed in the direction of travel F) of the frame 12 is shown since the left-hand portion has a similar tube within a tube construction and is generally a mirror image of the portion 10. A wing section 16 (FIG. 2) is adapted for support from the main frame 12 includes a tube within a tube construction of the type similar to that of the main frame 12. On the drawings, portions of the wing frame 16 are numbered identically to corresponding to portions of the main frame 12 but are distinguished by a prime after the number.

The main frame 12 includes a continuous fore-and-aft extending tubular member or main beam 22 having a rectangular cross section with first and second upright sidewalls 24 and 26 connected by top and bottom walls 28 and 30. The tubular member 22 has a generally rectangular cross section with the sidewalls 24 and 26 defining a preselected tube height which, as shown in FIG. 1, is greater than the tube width defined by the walls 28 and 30. On the main frame 12, the hitch connector 14 is apertured to conform to and receive the member 32 and is fixed to the forward end of the tubular member 22.

The main frame 12 includes transverse tubular members 32, 34, 36 and 38 having rectangular cross sections with front and rear walls 44 and 46 and top and bottom walls 48 and 50 walls spaced a distance apart which is less than the spacing between the top and bottom walls of the member 22. Both sidewalls 24 and 26 of the tubular member 22 are apertured at locations 52, 54, 56 and 58 and receive the corresponding tubular members 32–38. The apertures at 52–58 are generally vertically centered relative to the sidewalls and conform to the cross section of the corresponding members 32–38 to facilitate fabrication of the frame with minimal weld fixtures and provide mechanical support for the members to help resist torque loads and bending. Continuous fillet welds 60 (FIG. 3) at both walls around each aperture location fix the transverse tubular member to the walls 24 and 26 of the tubular member 22.

As shown in FIG. 1, the main frame 12 includes an inner fore-and-aft extending connecting plate or beam member 66 welded or otherwise fixed to the inner ends of the members 32–38 in parallel relationship with the member 22. The plate 66 is apertured and bolted to the corresponding plate (not shown) on the left-hand section of the main frame. Alternatively, the main frame may be formed as a single weldment with the transverse members 32–38 extending continuously through both main fore-and-aft members 22. The two-piece construction provides easier handling and shipping.

Figure 5:
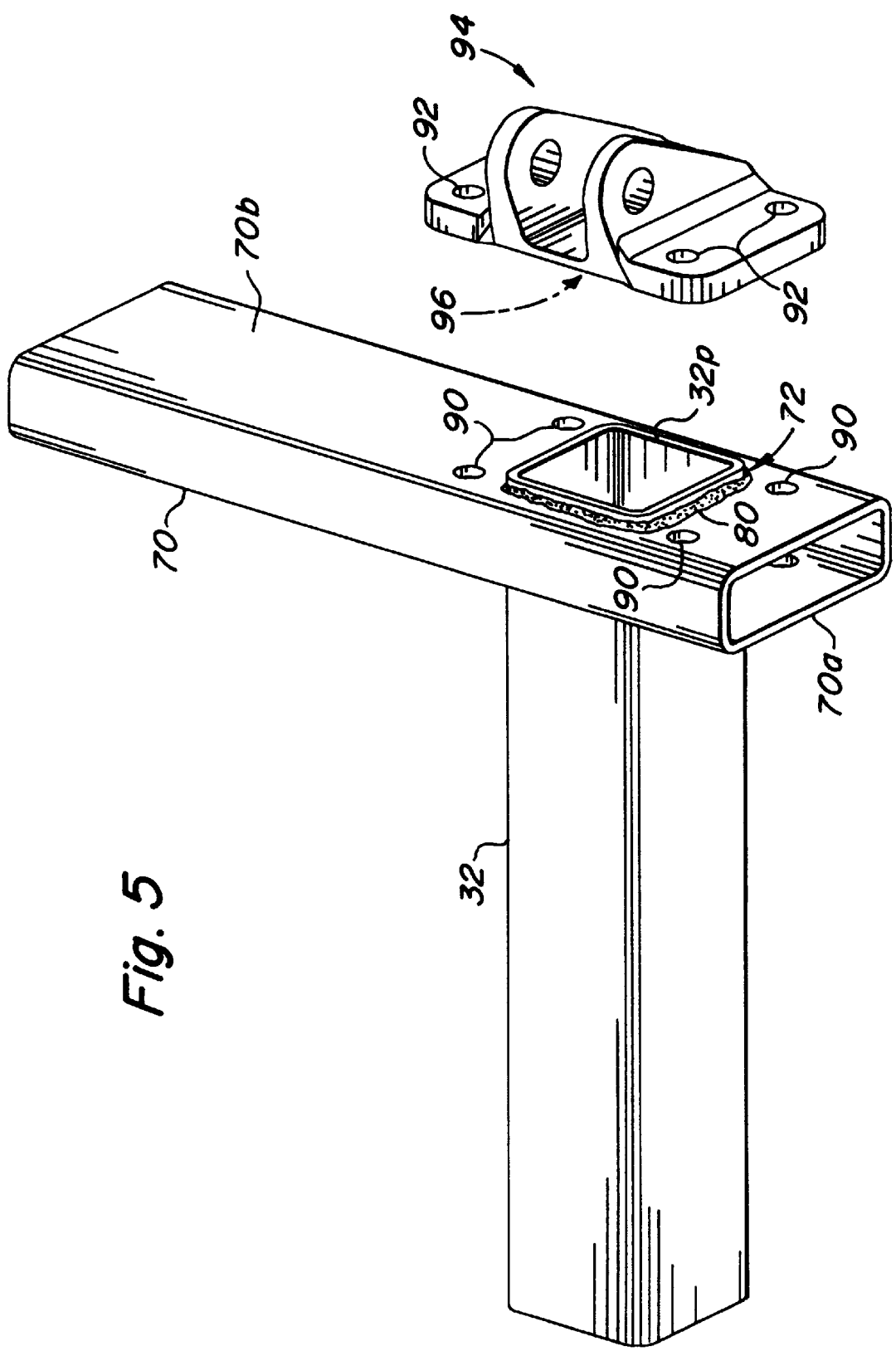
FIG. 5 is a view of an end portion of an implement frame section showing an alternate embodiment of the joint area for a hinge location.

The outermost ends of the transverse members 32–38 are connected to an outer fore-and-aft extending member 70 which is generally of the same height as (but may be narrower than) the member 22. The member 70 may be apertured at locations 72, 74, 76 and 78 to receive the ends of the corresponding transverse members 32–38, and fillet welds around the locations rigidly secure the members together. In the embodiment shown in FIG. 5, both the inner and outer walls (see 70a and 70b) of the member 70 are apertured to conform to and receive the ends of the transverse members 32–38, and the end of each member projects slightly outwardly from the outer wall (see 32p of FIG. 5). Continuous fillet welds 80 between the outer wall 70b and the projection 32p, and between the inner wall 70a and the member, rigidly fix the members 32–38 to the member 70. Alternatively, only the inner wall (see 70a' of FIG. 4) is apertured, and the transverse member (T of FIG. 4) extends through the aperture and terminates within the member 70'. A continuous fillet weld is then formed around the aperture location. If the end of the member T contacts the inside of the member 70', a drain hole may be provided at 84 to assure paint can drain from within the tube T during painting operations. Apertures 90a and 90b for hinge connections are formed in the walls 70a' and 70b' near the tube T and apertures 92' in a hinge casting 94' are aligned the apertures 90a and 90b. Bolts (not shown) are inserted through the apertures 90a, 90b and 92' and tightened to secure the hinge casting 94' against the outer wall 70b'. The welded wall construction stiffens and strengthens the wall 70a' and prevents wall collapse to retain hinge bolt torque. In the double weld construction as shown in FIG. 5, additional wall strength is provided adjacent the hinge locations. Apertures 90 in the walls 70a and 70b align with apertures 92 in a hinge casting 94, which includes a hollow portion indicated generally at 96 to receive the projection 32p and fillet weld 80. Bolts (not shown) are inserted through the apertures and tightened to secure the hinge casting 94 against the wall 70b. The double weld construction stiffens and strengthens the walls 70a and 70b against collapse.

The wing frame 16 shown in FIG. 2 includes fore-and-aft member 100 apertured at locations 102, 104 and 108 to receive the transverse member 32', 34' and 38' therethrough. Fillet welds secure the members to the sidewalls of the member 100. The end of the transverse member 36' is welded to the outside wall of the member 100, and apertures at 110 are provided to mount stub frames. Hinge plates 112, 114, and 118 are welded to the ends of the members 32', 34' and 38'. If the wing frame 16 is utilized as the inner section of a five-section machine, additional hinges are mounted on the outer fore-and-aft member 70' as shown in FIG. 4. Drain holes are not required in the transverse tube (32') since the tube is totally capped by 70' and 112. Paint is allowed to move freely throughout fore-and-aft member 22' during painting operations.

As shown, the frame sections are vertically compact and lie generally within parallel planes defined by the top and bottom walls 28 and 30 (28' and 30') of the main fore-and-aft members. The tubular members 22 (FIG. 1) define a strong, continuous frame section backbone and provides excellent hitch load transfer from the transverse tubular members on the main frame 12 without bridge or sub-frame structure. A rear hitch can be attached to the aft ends (22a of FIG. 1) of the members, with the rear draft loads efficiently transferred to the front hitch through the members 22.

Having described the preferred embodiment, it will become apparent that various modifications can be made without departing from the scope of the invention as defined in the accompanying claims. For example, although in the preferred embodiment the fore-and-aft members are apertured, the fore-and-aft tubes could pass through apertures in laterally extending tubes.

We claim:

1. An implement frame for an implement having ground engaging tools and adapted for towing forwardly over the ground, the implement frame comprising:
   a first tubular member having a rectangular cross section with first and second sidewalls connected by upper and lower walls, the first and second sidewalls spacing the upper and lower walls a first distance apart;
   a second tubular member having a rectangular cross section with top and bottom walls spaced a second distance apart, the second distance being less than the first distance;
   the first sidewall of the first tubular member including an apertured portion having an aperture between the upper and lower walls conforming to the cross section of the second tubular member and receiving the second tubular member therethrough and resisting torque and bending moments introduced when the ground-engaging tools are towed forwardly through the ground;
   connecting structure securing the first tubular member to the second tubular member adjacent the aperture in a generally fixed relationship to the second tubular member; and
   a third member offset from and extending parallel to the first tubular member and connected to the second tubular member, the third member helping to maintain the fixed relationship between the first and second tubular members.

2. The implement frame set forth in claim 1 wherein the second tubular member terminates within the first tubular member, and wherein the connecting structure comprises a weld extending around the apertured portion.

3. The implement frame as set forth in claim 1 wherein both the first and second sidewalls of the first tubular member are apertured and the second tubular member projects through the first tubular member.

4. The implement frame as set forth in claim 3 wherein the first tubular member comprises a fore-and-aft extending hitch draft member.

5. The implement frame section as set forth in claim 4 wherein the third member comprises a third tubular member, the first and third tubular members including first and second sets of apertures aligned in the transverse direction, and two second tubular members, one of the second tubular members extending transversely through the first set of apertures, and the other second tubular member extending transversely through the second set of apertures.

6. The implement frame as set forth in claim 5 wherein the second tubular members are welded to both sidewalls of the first and third tubular members.

7. An implement frame comprising:
   a first tubular member having a rectangular cross section with first and second sidewalls connected by upper and lower walls, the first and second sidewalls spacing the upper and lower walls a first distance apart;
   a second tubular member having a rectangular cross section with top and bottom walls spaced a second distance apart, the second distance being less than the first distance;
   the first sidewall of the first tubular member including an apertured portion having an aperture between the upper and lower walls conforming to the cross section of the second tubular member and receiving the second tubular member therethrough;
   connecting structure fixing the first tubular member to the second tubular member adjacent the aperture;
   wherein the second tubular member terminates within the first tubular member; and
   further comprising a bracket connected to the second sidewall of the first tubular member in axial alignment with the second tubular member, the bracket including a base having a cross section with end portions projecting on opposite sides of the aperture, and connectors extending through the first and second sidewalls of the first tubular member and the end portions of the bracket base.

8. An implement frame comprising:
   a first tubular member having a rectangular cross section with first and second sidewalls connected by upper and lower walls, the first and second sidewalls spacing the upper and lower walls a first distance apart;
   a second tubular member having a rectangular cross section with top and bottom walls spaced a second distance apart, the second distance being less than the first distance;
   the first sidewall of the first tubular member including an apertured portion having an aperture between the upper and lower walls conforming to the cross section of the second tubular member and receiving the second tubular member therethrough;
   connecting structure fixing the first tubular member to the second tubular member adjacent the aperture;

wherein both the first and second sidewalls of the first tubular member are apertured and the second tubular member projects through the first tubular member; and wherein the second tubular member terminates in an end projection outwardly adjacent the second sidewall, and further comprising a bracket having a recessed portion supported over the end projection.

9. An implement frame for an implement having ground engaging tools and adapted for towing forwardly over the ground, the implement frame comprising:

first and second fore-and-aft extending hitch tubes, the hitch tubes having sidewall with apertures of preselected configuration;

transverse tubes having outer and inner ends and supporting the ground working tools, the transverse tubes supported at joint locations between their ends in the apertures, the transverse tubes extending generally perpendicularly to the hitch tubes and having a cross section conforming generally to the preselected configuration of the apertures for mechanical support by the hitch tubes to resist bending and torque loads and transmitting draft loads from the ground engaging tools to the hitch tubes; and connecting structure fixing the joint locations of the transverse tubes to the hitch tubes.

10. The implement frame as set forth in claim 9 wherein the connecting structure comprises welds connecting the transverse tubes to the hitch tube sidewalls.

11. The implement frame as set forth in claim 9 wherein the frame comprises individual left and right frame sections, each section having an inwardmost fore-and-aft extending end member, the end members connected to each other to define a main frame section.

12. The implement frame as set forth in claim 11 wherein the left and right frame sections are generally mirror images of each other and include the first and second hitch tubes, respectively.

13. The implement frame as set forth in claim 9 including an outer end member which is tubular and includes outwardly and inwardly directed sidewalls, the inwardly directed sidewall being apertured to receive the outer ends of the transverse tubes.

14. An implement frame for an implement having ground engaging tools and adapted for towing forwardly over the ground, the implement frame comprising:

first and second fore-and-aft extending hitch tubes, the hitch tubes having sidewalls with apertures of preselected configuration;

transverse tubes having outer and inner ends and supporting the ground working tools, the transverse tubes supported at joint locations between their ends in the apertures, the transverse tubes extending generally perpendicularly to the hitch tubes and having a cross section conforming generally to the preselected configuration of the apertures for mechanical support by the hitch tubes to resist bending and torque loads and transmitting draft loads from the ground engaging tools to the hitch tubes;

connecting structure fixing the joint locations of the transverse tubes to the hitch tubes;

an outer end member which is tubular and includes outwardly and inwardly directed sidewalls, the inwardly directed sidewall being apertured to receive the outer ends of the transverse tubes; and further comprising bracket structure connected to the outwardly directed sidewall adjacent one of the outer ends of the transverse tubes, wherein the transverse tubes are welded to the inwardly directed sidewalls to define a weld joint, and the bracket structure includes a bracket connector extending through the outer end member adjacent one of the weld joints at the inner sidewall so that the weld joint lends bend resistance to the inner sidewall at the bracket structure.

15. The implement as set forth in claim 14 wherein the transverse tube adjacent the bracket structure extends through both the inwardly and outwardly directed sidewalls of the fore-and-aft extending member.

16. The implement frame as set forth in claim 15 wherein the transverse tube adjacent the bracket structure is welded to the inwardly and outwardly directed sidewalls of the fore-and-aft extending member.

17. The implement as set forth in claim 14 wherein the transversely extending tubes are welded to the outwardly directed sidewalls at weld locations.

18. The implement as set forth in claim 17 wherein the outwardly directed sidewalls are apertured and the weld locations are located adjacent the apertures.

19. An implement frame for an agricultural implement having ground engaging tools, the frame comprising:

a continuous fore-and-aft extending tubular frame member having a generally rectangular cross section with outer sidewalls of preselected height;

tool supporting transverse tubular members having cross sections with heights less than the preselected height and outermost end portions;

the tubular frame members including apertured portions with apertures of cross sections conforming to the cross sections of the transverse tubular members, the apertures receiving the transverse tubular members therethrough, the apertured portions providing mechanical support for the transverse tubular members;

a fore-and-aft extending tubular support member having upright sidewalls with at least one of the upright sidewalls including apertures for receiving the transverse tubular members at locations transversely offset from the tubular frame member and supporting the transverse tubular members in parallel relationship to each other; and connecting structure fixing the transverse tubular members to the apertured portions and to the tubular support member and providing a generally rectangular frame construction resistant to parallelogramming and torque and bending loads.

20. The implement frame as set forth in claim 19 wherein the connecting structure comprises fillet welds joining the transverse tubular members to the apertured portions.

21. The implement frame as set forth in claim 19 wherein the fore-and-aft extending tubular frame member includes top and bottom surfaces lying generally along parallel, vertically offset planes, and the rectangular frame construction lies substantially between the offset planes to provide a compact frame construction.

* * * * *